Dec. 15, 1959     R. S. DREFFIN     2,917,444
NEUTRONIC REACTOR CONTROL
Filed May 14, 1956     8 Sheets-Sheet 1

INVENTOR.
Roger S. Dreffin
BY
Roland A. Anderson
Attorney

Dec. 15, 1959   R. S. DREFFIN   2,917,444
NEUTRONIC REACTOR CONTROL
Filed May 14, 1956   8 Sheets-Sheet 2

INVENTOR.
Roger S. Dreffin
BY
Attorney

Dec. 15, 1959  R. S. DREFFIN  2,917,444
NEUTRONIC REACTOR CONTROL
Filed May 14, 1956  8 Sheets-Sheet 3
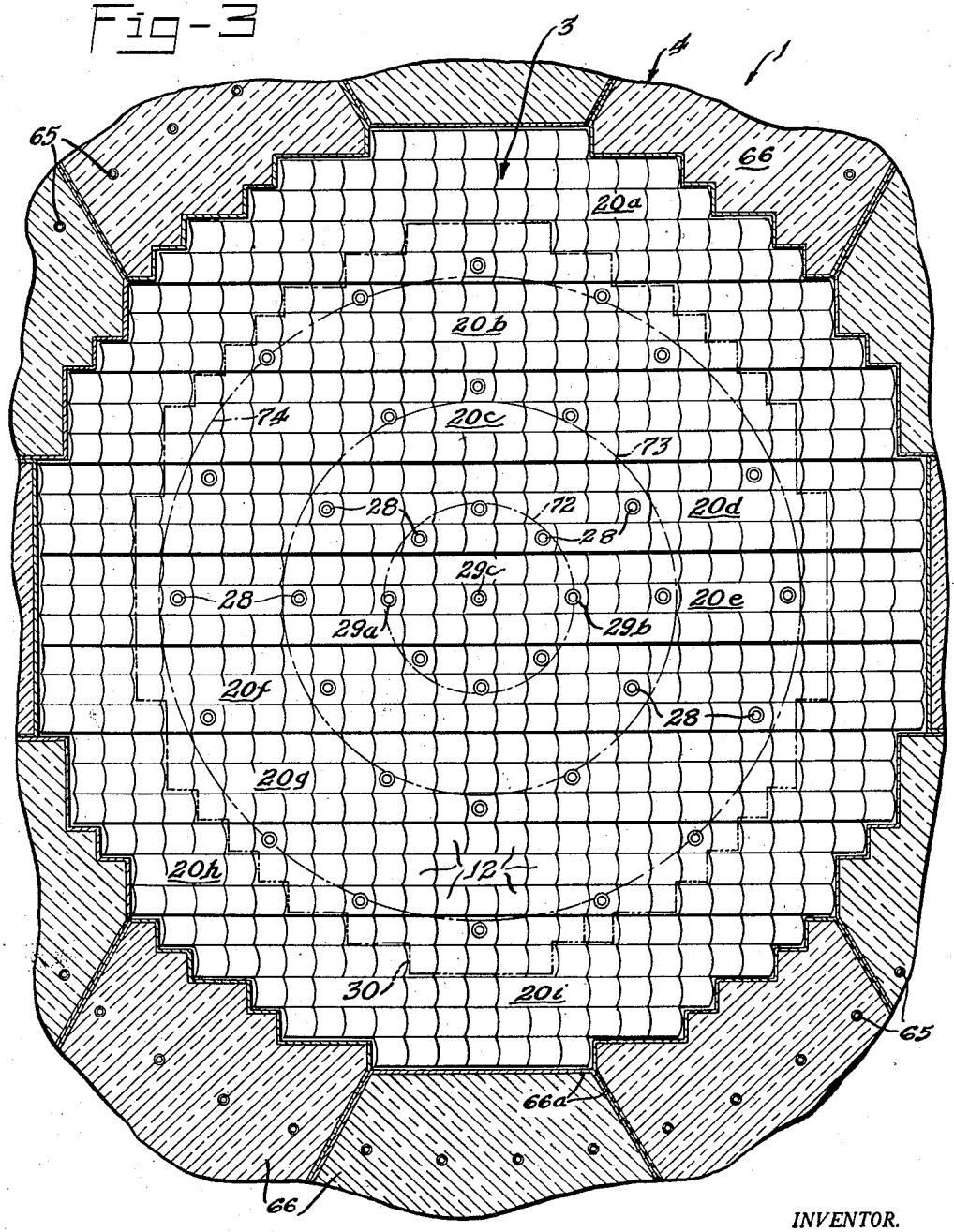
INVENTOR.
Roger S. Dreffin
BY
Roland A. Anderson
Attorney

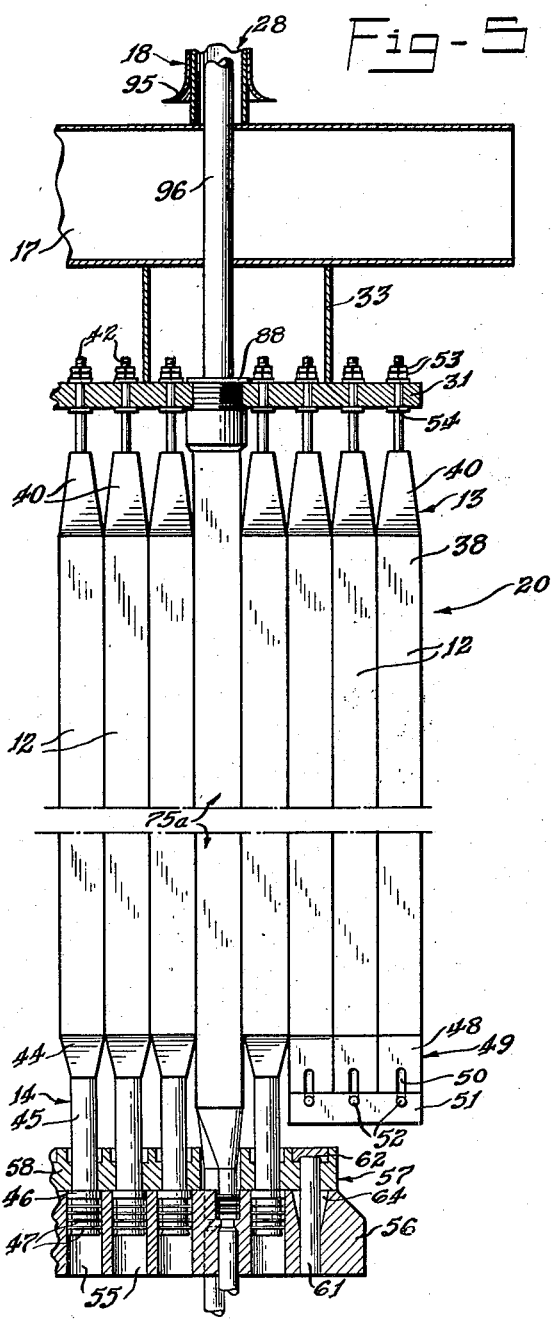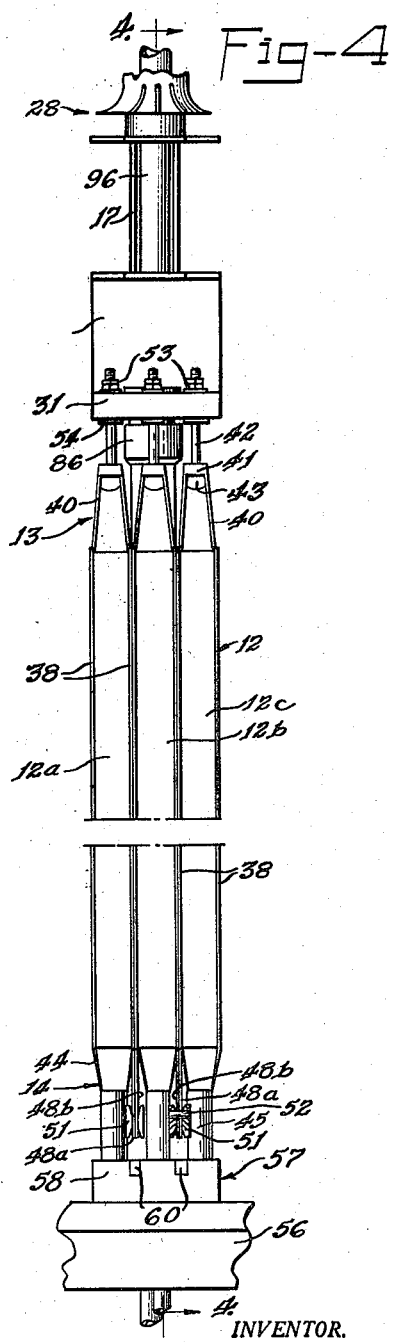

Dec. 15, 1959  R. S. DREFFIN  2,917,444
NEUTRONIC REACTOR CONTROL
Filed May 14, 1956  8 Sheets-Sheet 5
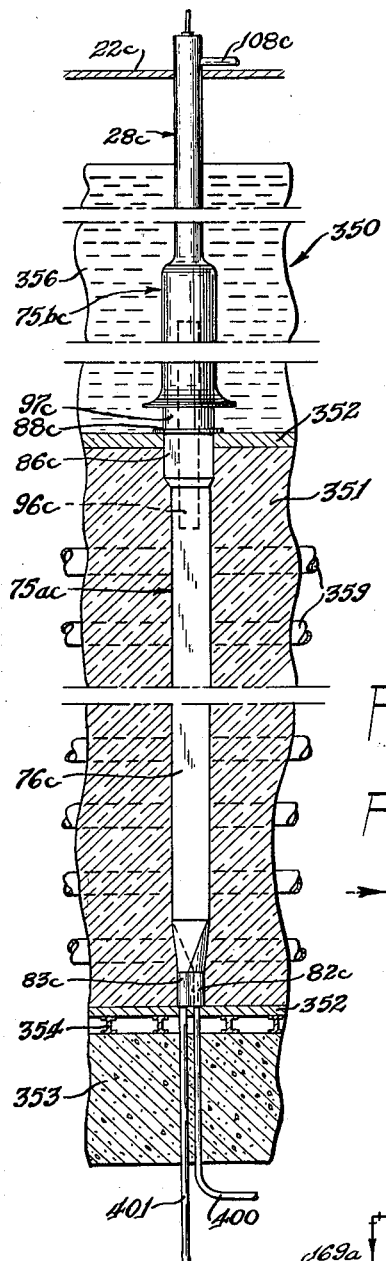
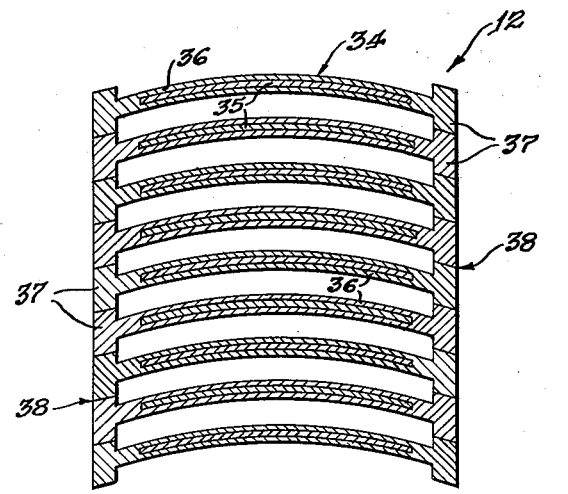
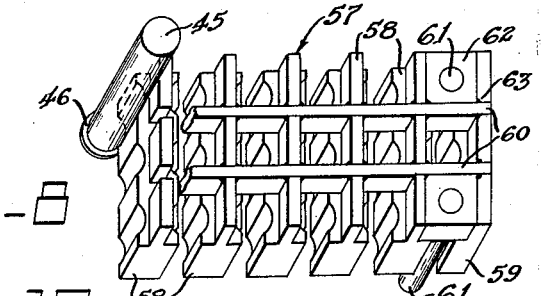
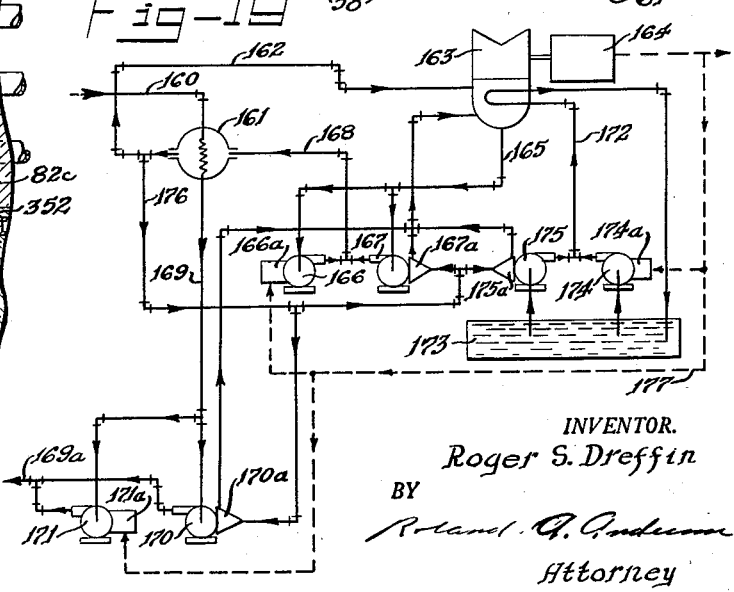
INVENTOR.
Roger S. Dreffin
BY
Roland G. Anderson
Attorney Dec. 15, 1959 R. S. DREFFIN 2,917,444
NEUTRONIC REACTOR CONTROL
Filed May 14, 1956 8 Sheets-Sheet 6
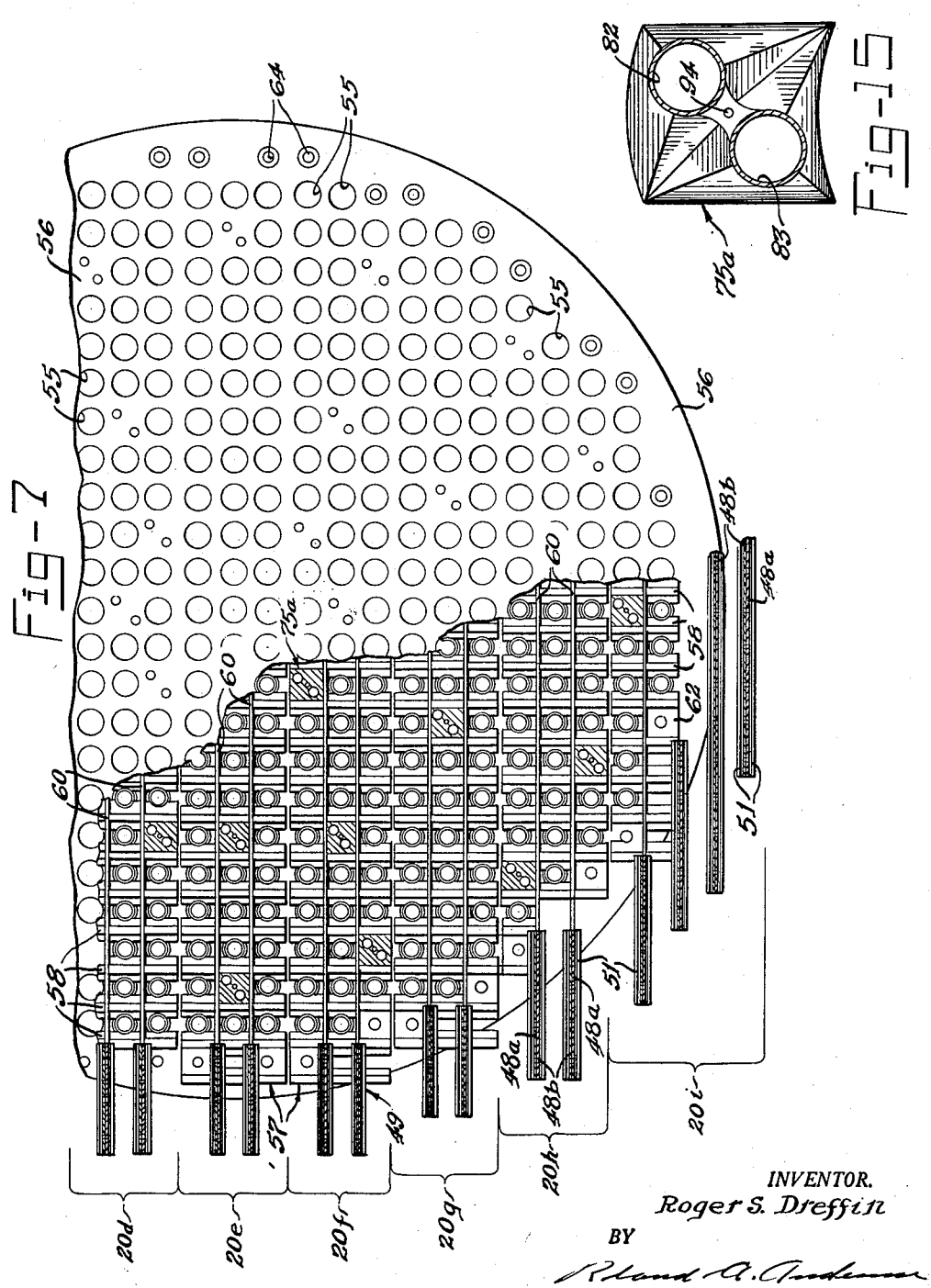
INVENTOR.
Roger S. Dreffin
BY
Roland A. Anderson
Attorney

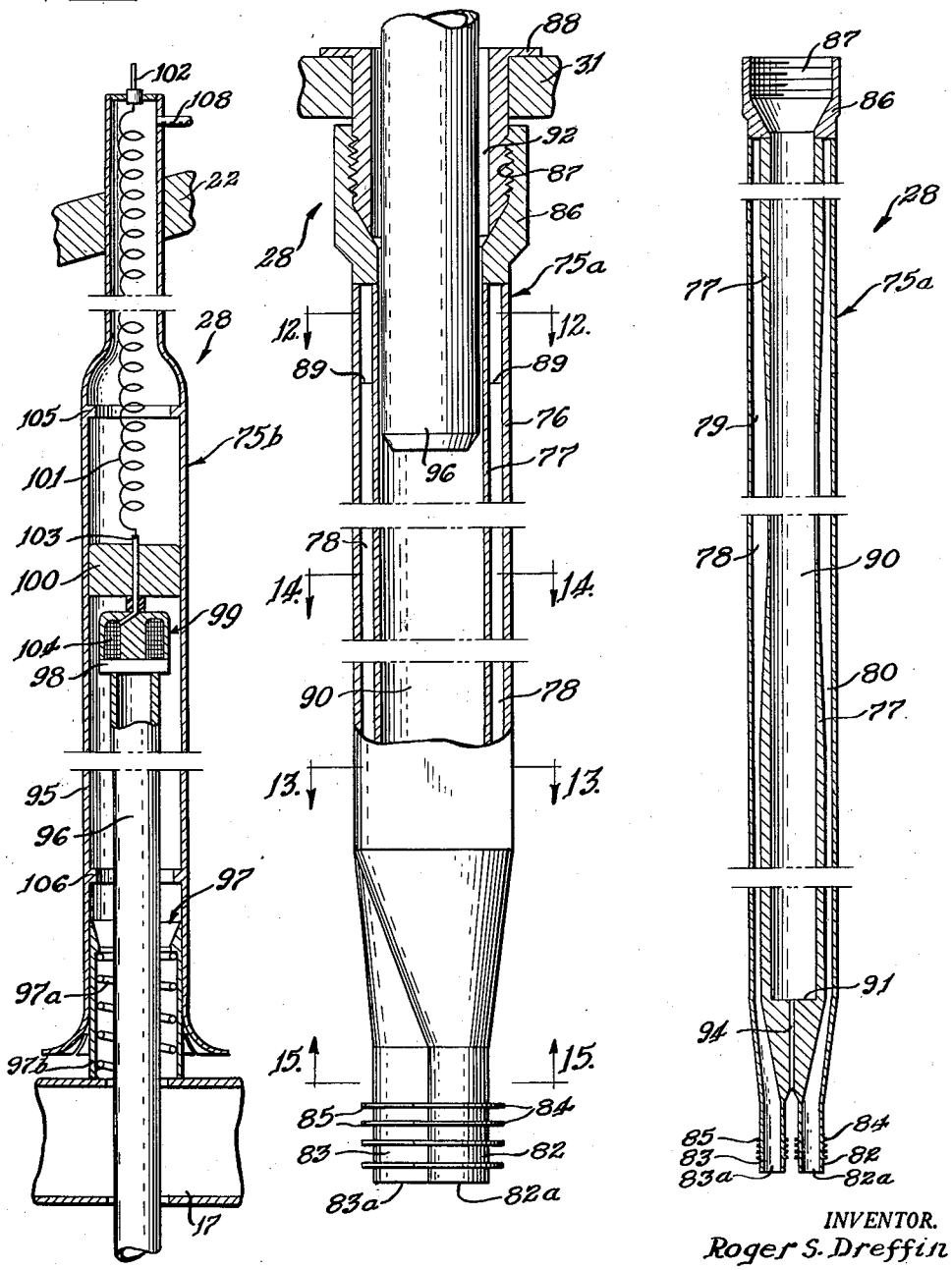

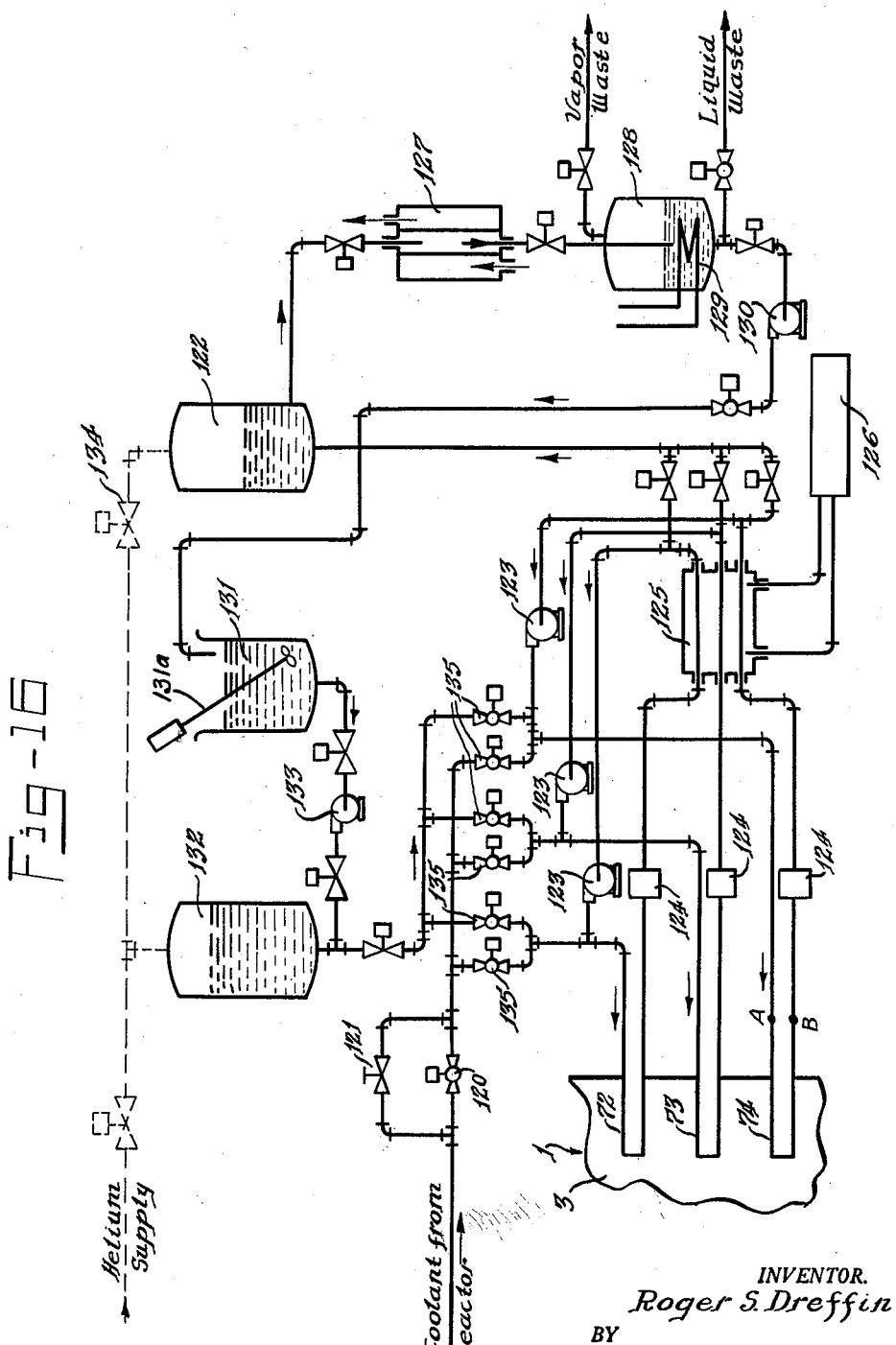

United States Patent Office 2,917,444
Patented Dec. 15, 1959

2,917,444

NEUTRONIC REACTOR CONTROL

Roger S. Dreffin, Glen Ellyn, Ill.

Application May 14, 1956, Serial No. 584,866

13 Claims. (Cl. 204—193.2)

This invention relates generally to apparatus for controlling reactivity in neutronic reactors and in particular to apparatus utilizing fluid neutron absorber materials for achieving particular neutron flux distributions in reactors.

A neutronic reactor, as is well known in the nuclear art, is an apparatus comprising essentially an active portion containing thermal-neutron fissionable fuel distributed in a moderator material surrounded by a reflector and a plurality of control devices for controlling the release of neutrons from the fuel by incident thermal neutrons. Specific details of the theory and essential characteristics of various reactors are set forth in Patent 2,708,656, issued to Fermi and Szilard on May 17, 1955. In some of such neutronic reactors, the rate of the reaction is controlled by actuating devices, made of materials having high neutron absorbing characteristics, commonly referred to as "neutron capture cross-section," in a central region (core) of the active portion of the reactor or in an area closely adjacent to said active portion. These devices, using solid absorber materials such as boron or cadmium, are known as control elements and fall into three classifications, namely fine control, shim control and safety control (or "scram"). The fine control usually maintains the reactor accurately at "critical" which corresponds to a position of the reactor where neutron balance is maintained, i.e., the rate of neutron generation in the fission process is equal to the rate of neutron fission capture plus the neutrons lost through leakage and nonfission capture. The action of the fine control may be rapid mechanically but is confined to a small magnitude in reactivity change. The shim control regulates the control point over a wide range to compensate for large, long-time effects such as fission product poisoning and fuel burnup. The safety control is utilized to shut down rapidly the reactor in an emergency by causing it to be "below critical." This usually occurs when the reactor output reaches an above normal power output condition.

The above described control elements, which as used generally at the present time, are usually adapted to occupy individual positions within the core of the reactor. For example, the shim and fine control elements are moved into or out of the confines of the reactor to achieve a particular reactive condition. The use of the shim and fine control elements to achieve reactivity control has a disadvantage in that the resultant axial and radial neutron-flux distributions in the active portion of the reactor are not uniform. The insertion of a control element into the reactor results in a local flux depression or perturbation because of its large absorbing capacity, as shown ing Fig. 11.10, by Glasstone and Edlund, in "The Elements of Nuclear Reactor Theory," D. Van Nostrand Co. Inc., 1952, page 317. This uneven flux distribution may be the cause of abnormal local temperature rises commonly known as "hot spots" which cause thermal stresses in fuel elements and other parts of reactor structure. These hot spots are due to "tip effect" which condition occurs at the tips of control elements partly inserted into the core of a reactor. The portion of the neutron absorbing material at the very tip of the control elements is "shadowed" on only one side by the remainder of the material forming the control element. Consequently, this material absorbs considerably more neutrons than the material situated a diffusion length or two from the tip of the element. The tip of the element receives also a relatively stronger dose of core gammas than the portions further from the tip. The tip effect is even more pronounced in a liquid-moderated reactor because upon withdrawal of the control element, the space formerly occupied by the element is filled with the moderator. As a result, maximum power output of the reactor may not be achieved because of its operating limitations imposed by these local disturbances. From a heat transfer point of view, a nearly flat flux distribution is desirable. Similarly, uniform fuel burnup is most readily obtained with a relatively flat neutron flux distribution. Additionally, the channels in the reactor occupied by the control elements have to be large to allow for heat expansion of said elements since they are often inadequately cooled, therefore introducing larger voids in the moderator than desirable. The incorporation of additional channels within the core of a reactor for admitting individual safety control elements may also distort the flux distribution to a certain extent and is not conducive to uniform flux distribution.

Some of the control systems used for controlling reactors utilize a fluid neutron absorber or "poison" in a cooling system in lieu of control elements made of solid materials. The use of a neutron absorber compound dissolved or carried in a primary coolant of a reactor is not too advantageous for control purposes either. Since the primary coolant comes in contact with many components in the reactor structure, erosion and corrosion may be the attendant problems. Also, since the primary coolant, unless subjected to a high pressure, may be susceptible to gas dissociation, means must be provided for recombining the gaseous products.

The primary object of the invention is to provide a control means which is capable of minimizing distortion in the axial flux pattern and producing a flatter radial flux pattern during reactor operation and also to provide for a complete shutdown of the reactor.

Another object of the invention is to provide a control means adapted to remain in the core of a reactor, said device having longitudinal channels and a central bore therein adapted to receive a neutron-absorbing element, said channels having varying cross sections and being filled with a liquid poison to provide an integrated shim and safety control means.

A further object of the invention is to provide a neutronic reactor system in combination with a control device which will provide maximum power output realizable in in said reactor.

Other objects and advantages of neutronic reactors constructed according to the teachings of the invention will become readily apparent from a study of the following description of the invention, together with the illustrative embodiment shown in the drawings, wherein:

Fig. 3 is an enlarged cross section view of the active portion of the reactor taken along the line 3—3 of Fig. 1;

Fig. 4 is an end view of a fuel assembly;

Fig. 5 is a partial side view of the fuel assembly shown in Fig. 4;

Fig. 6 is a transverse cross section view of a fuel element showing the construction thereof;

Fig. 7 is an enlarged cross-section view of the reactor taken along the line 7—7 of Fig. 1;

Fig. 8 is a schematic view of a portion of a grid used for aligning the lower extremities of the fuel elements in each fuel assembly;

Fig. 9 is a cross section view of the upper portion of a control device to show the internal construction thereof;

Fig. 10 is an enlarged cross section view of the lower portion of the control device showing the internal structure thereof;

Fig. 11 is a cross section view of the lower portion of the control device taken along the line 11—11 of Fig. 12 to show the varying cross section of internal channels;

Fig. 12 is a cross section view of the control device taken along the line 12—12 of Fig. 10;

Fig. 13 is a cross section view of the control device taken along the line 13—13 of Fig. 10;

Fig. 14 is a cross section view of the control device taken along the line 14—14 of Fig. 10;

Fig. 15 is a cross section view of the control device taken along the line 15—15 of Fig. 10 to show the termination of the control device tapering into a pair of openings;

Fig. 16 is a schematic view of a control system for regulating the concentration of poison in the control devices;

Fig. 18 discloses a modification of a shim control device utilized for controlling neutronic reactivity in a liquid-cooled, graphite-moderated reactor of a known design; and Fig. 19 shows schematically a turbo generating system adapted to connect the steam output of the reactor into electrical power.

In accordance with the teachings of this invention, there is provided a neutronic reactor controlled by devices, utilizing neutron absorbing fluid therein, for controlling the reactivity of the active portion of a reactor. The device comprises a pair of channels communicating with each other at one extremity thereof, one channel having an inlet and serving as a first pass for the incoming fluid and the other channel having an outlet and serving as a second pass for the outgoing fluid. The cross section area of each channel increases from each end thereof toward the middle section of the device thereby presenting a maximum neutron absorbing barrier in the middle section thereof. A structure comprising the channels defines a bore for the introduction of a safety element which cooperates with the fluid in the device for effecting a rapid shutdown of the reactor.

The embodiment of this invention is capable of being utilized in numerous reactors and is described with particularity with reference to a water-cooled, water-moderated reactor. This type of a reactor uses light water both for moderating and for cooling the reactor.

REACTOR STRUCTURE

Figure 1:
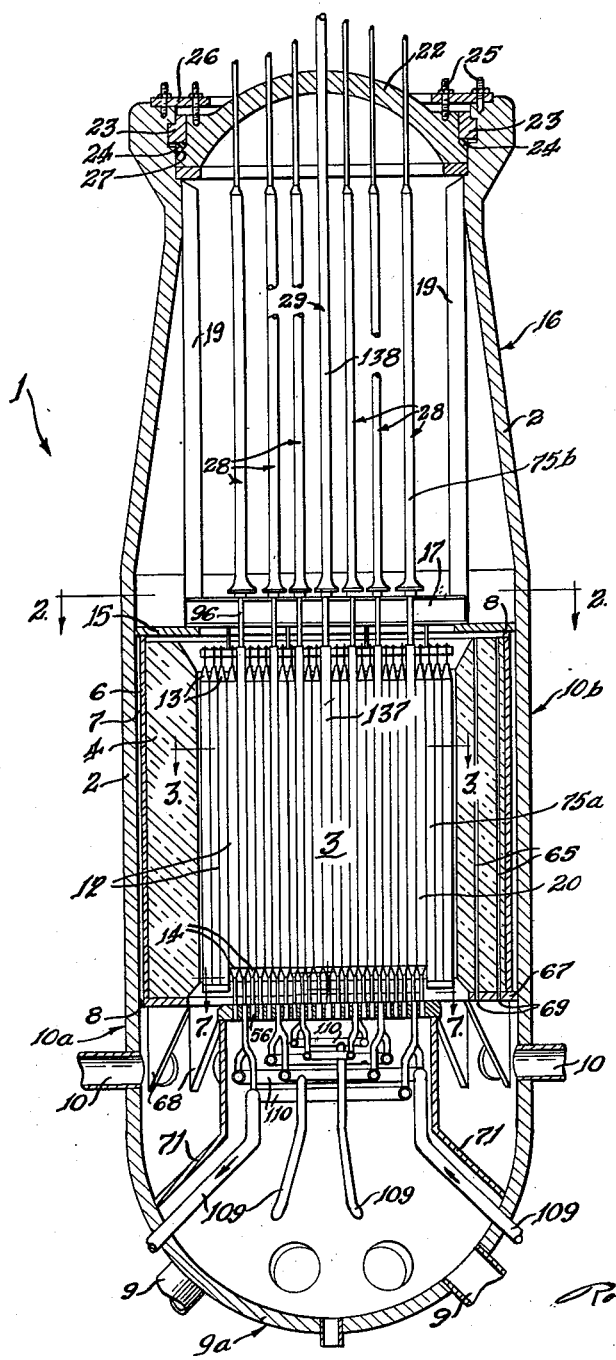
Fig. 1 is a cross sectional view of a water-cooled, water-moderated reactor which is controlled by control devices constructed in accordance with the teachings of this invention.

The internal structure of a typical water-cooled, water-moderated reactor is shown in Fig. 1 wherein a reactor 1 comprises a steel pressure vessel 2 surrounding a core 3 of the reactor. The core 3 is 8' in diameter and 10' high and is surrounded by a reflector 4. Surrounding the reflector 4 is a 2" thick stainless steel-clad thermal shield 6 made of steel and used to protect the pressure vessel 2 from radiation so that the steel of the pressure vessel is not subjected to high operating temperatures. Between the thermal shield 6 and the pressure vessel 2, there is a 1" thick annulus 7 through which a water coolant flows to absorb the heat generated in the inner shell and the vessel wall. This water flow area has restricted inlet openings 8 at the bottom of the annulus 7 to provide the proper water flow. The section of the pressure vessel 2 containing the reactor core 3, the reflector 4 and the thermal shield 6 has an internal diameter of 12'.

There are a series of inlet ports 9 located in the hemispherical lower end section 9a of the pressure vessel 2 and a plurality of coolant outlet ports 10 located in adjacent straight cylindrical outlet section 10a which extends to the bottom of the core 3. These two sections 9a and 10a comprise a portion 10' high in the pressure vessel 2. Immediately above the coolant outlet section 10a is a core section 10b containing the core 3 and extending a total length of 11' 6" to contain fuel elements 12 having upper transition pieces 13 and lower transition pieces 14. Details of the structure of the fuel elements 12 will be described hereinafter. Above the core section is a tapered section 16 which is 15' 6" long and tapers from 12' inner diameter to 9' inner diameter at its upper end. This tapered section contains a beam support ring 15, which carries the entire weight of the fuel elements 12 and fuel support beams 17, and which withstands the shock of falling safety elements during a reactor rapid shutdown or "scram." Extending from the top of the vessel 2 down to the beam-support ring 15, there are a series of steel members 19 which serve the dual purpose of supporting partly the beam-support ring 15 and of guiding fuel assemblies 20 into position during a fuel loading operation. The members 19 are welded at one of their ends to the inner wall of the vessel 2 near the top thereof and at their other ends to the beam-support ring 15.

At the upper extremity of the pressure vessel 2, there is a head closure 22 which is removable for the purpose of gaining access to the interior of said vessel. The head closure 22 is locked to the pressure vessel 2 by a lock ring 23, said lock ring being divided into four sections for easy removal from the opening of said vessel. During the closing operation, the head closure 22 is allowed to rest on the members 19 while the sections of the lock ring 23 are inserted into position. A seal ring 24 forms a tight joint between the head closure 22 and the lock ring 23. The head closure 22 is forced against the seal ring 24 by drawing up on a series of bolt and nut combinations 25 which fasten the head closure 22 to the pressure vessel 2 through the medium of a flat ring 26. The head closure design described herein is very effective inasmuch as any pressure which is found within the pressure vessel 2 forces the head closure 22 in an upward direction (as shown in the illustration) thereby greatly compressing the seal ring 24 between a beveled shoulder 27 of the head closure 22, the inner wall of the pressure vessel 2 and the bottom of the lock ring 23. The only bolting required is for establishing an initial seal of the closure. Either a yielding or non-yielding material may be used in the construction of the seal ring 24. The main advantage of this type of head closure is its ease of removal during refueling and maintenance operations. It is also quite adaptable to be handled remotely during remote refueling operation. All the internal surfaces of the pressure vessel 2, as well as the head closure 22, are clad with stainless steel to provide satisfactory corrosion resistance to water. These internal surfaces have a smooth finish to prevent the lodging of water impurities, corrosion products or fission products in crevices. The pressure vessel 2 has a wall thickness of about 4½" with reinforcements around the various openings.

The core 3 of the reactor 1 is a right cylinder, approximately 8' in diameter and 10' high. It is composed of 678 fuel elements 12, 34 shim control devices 28 and 3 regulating elements 29. The fuel elements are arranged in nine fuel assemblies 20 as is shown in Figs. 2, 3, 4 and 5. These fuel assemblies are numbered 20a, 20b, 20c, 20d, 20e, 20f, 20g, 20h and 20i in Fig. 3. Seven of the fuel assemblies, 20b, 20c, 20d, 20e, 20f, 20g and 20h are three fuel elements wide and the other two fuel assemblies 20a and 20i are five elements wide at the broadest point. A 0.25" space separates the fuel assemblies 20a, 20b, 20c, 20d, 20e, 20f, 20g, 20h and 20i to provide clearance for loading and unloading. The fuel assembly 20 contains from 67 to 80 fuel elements 12 and from one to seven shim control devices 28. A boundary 30 (Fig. 3) serves to indicate that the fuel elements encompassed thereby are in the first pass for initially conducting the flow of coolant in one direction, and the fuel elements outside of said boundary are in the second pass for subsequently conducting the flow of coolant in the reverse direction.

Each fuel assembly 20 has a grid 31 for supporting the fuel elements 12 in groups and every grid 31 is supported from an individual fabricated stainless steel double I-beam 17 by stainless steel supports 33 welded across the width of the beam 17 every 12.96" as is indicated in Figs. 4 and 5. The beams 17, in turn, rest on the support ring 15 inside the reactor vessel 2. As shown in Fig. 6, each fuel element 12 consists of nine fuel plates 34, each having a fuel core 35 clad with a 10 mil zirconium-tin alloy jacket 36 having two T-shaped lateral extensions 37. The distance between adjacent jackets 36 is 0.201". The plates 34 have a length of slightly over 10'. The fuel core 35 is 0.139" thick by 2.5" wide by 10' long and made of natural uranium (slightly enriched) having a total content of 1.36% of uranium-235. Each fuel plate 34 may be fabricated by a process that involves assembling a core, a hollow rectangular frame enclosing the core, and cover plates on opposite sides of the plates and core and rolling to bond the core, frame, and plates to one another as described in the copending Saller application, Ser. No. 323,348, filed December 1, 1952. The lateral edges of the plates 34 are set apart by a special head seam-welder which heats the edges by resistance and upsets it into a die to thereby make the lateral extensions 37, which extensions serve to space said plates and, in addition, form a pair of continuous side walls 38 for each fuel element 12. The nine fuel plates 34 are assembled in a jig and the extensions 37 are tack-welded by a shielded arc-welding process. After fabrication, each fuel element 12 is straightened, annealed, and machine-finished.

Each of the 406 fuel elements 12 in the first pass is supported by means of an upper transition piece 13 (Figs. 4 and 5) which consists of two trapezoidal pieces 40 of 50-mil thick zirconium plate having their wide ends welded to the side walls 38 and having their narrow ends welded to a 1" thick zirconium block 41. The block 41 has a hole drilled through it for engaging a stud 42 having a head 43 supporting the fuel element 12 from the fuel support grid 31. The lower transition piece 14 has a pair of trapezoidal zirconium pieces 44 which have one end thereof welded to the lower extremity of the fuel element 12, specifically to the side walls 38, and the other end welded to one end of a cylindrical portion 45 which is cut to length from drawn seamless or seam-welded zirconium tubes. A collar 46, about 0.500" thick, for alignment purposes, as will be indicated hereinafter, and four 0.010" thick seal rings 47 are welded to the other end of the cylindrical portion 45 of the lower transition piece 14. The fuel elements 12 terminating in the lower transition pieces 14 are a part of the first pass system wherein the coolant introduced into the reactor 1 completes the first part of its passage in absorbing heat developed in said fuel elements.

The remaining 272 fuel elements 12 comprise the second pass system and do not have lower transition pieces. They merely have extension members 49 having extension pieces 48 (Figs. 4 and 5) of zirconium welded to the side walls 38 of the fuel elements 12a, 12b and 12c to extend them for alignment purposes. The fuel elements, such as 12a and 12c, which are located along the lateral periphery of each of the nine fuel assemblies 20, as shown in Fig. 4, have only one extension piece 48a extending from the side wall 38, while the fuel elements 12b located in the center of each fuel assembly have extension pieces 48b extending from both side walls 38. Each extension piece 48 has a slot 50 cut in the side thereof (Fig. 5). Alignment bars 51 are disposed at the free ends of the extension pieces 48 and snugly fastened thereto by rivets 52 which slidably engage with the slot defining portion of the extension pieces. It will be noticed that the engaging surfaces of the bars 51 have a taper so as to present a minimum of friction to the movement of any fuel element undergoing a dimensional change in the longitudinal direction. A bottom view of the extension piece-alignment bar assembly may be had in Fig. 7.

Each fuel element 12 is supported from the grid 31 by the studs 42 and nuts 53. A washer 54 is welded to each stud 42 to facilitate uniform positioning of the fuel elements 12 in the vertical plane so that they occupy the same level. All of the fuel elements 12 which are contained in the first pass are located in the central portion of the core 3, as indicated by the boundary 30 in Fig. 3. Each of these elements 12 has a lower transition piece 14 (Fig. 5) which fits into an opening 55 in the tube sheet 56 which is permanently mounted in the reactor vessel 2. The lower transition piece 14 with its associated seal rings 47 is adapted to engage with its individual opening 55 in the tube sheet 56, said seal rings preventing substantially any leakage of the coolant but at the same time allowing for vertical movement of the fuel element 12 due to growth or shrinkage.

The fuel elements 12 that are grouped together in an assembly and which form the first pass are aligned together and secured at their free ends by means of a grid 57 (Figs. 4, 5 and 8) comprising a plurality of crosspieces 58, end pieces 59, bars 60 and alignment studs 61. As is clearly indicated in Fig. 8, each crosspiece 58 has several arcuate depressions for accommodating the shape of adjacently disposed cylindrical portions 45 of the lower transition pieces 14. Each bar 60 has a series of notches therein which are adapted to engage with similar notches in the crosspieces 58 for interlocking purposes. Each alignment stud 61 including its base 62 occupies a space defined between the crosspiece 58, the end piece 59, and the bar 60. The stud 61 is adapted to engage a tapered alignment opening 64 in the tube sheet 56. The disposition of the openings 64 in the tube sheet 56 is more clearly indicated in Fig. 7. During the assembly of the grid 57, the various components thereof are positioned atop the collars 46 on the lower transition pieces 14 and then secured together by spot welding at the junction of the notches as shown by spot welds 63. The base 62 is attached similarly to the grid 57. The purpose of this arrangement is to align the circular portions 45 of the lower transition pieces 14 with the openings 55 located in tube sheet 56, while each fuel assembly 20 is being lowered into the reactor vessel 2.

The reflector 4 forms an annular ring, approximately 1' 9" thick by 11' high between the core 3 and the inner wall of the thermal shield 6. As indicated in Fig. 3, the reflector 4 is composed of 12 sections 66 of graphite canned in stainless steel jackets 66a. These sections are shaped on the inner side to fit the contour of the core 3, with a 0.25" clearance all around. The sides of the sections 66 are shaped so that it is possible to remove any one section without disturbing more than one other section. Stainless steel tubes 65 pass through the entire length of the sections 66 to allow a portion of the water leaving the first pass to cool the reflector 4. The reflector sections 66 are supported by a support ring 67 (Fig. 1) which occupies a position slightly above the tube sheet 56. The support ring 67 also functions to support concentrically the thermal shield 6 within the pressure vessel 2. The support ring 67 is welded to the inner wall of the pressure vessel 2 and is also supported by triangular support members 68, which members are welded to both the inner wall of the pressure vessel and to the underside of the support ring 67. A plurality of openings 8 in the periphery of the support ring 67 serve as exits for the water present at the top of the annulus 7. Another plurality of openings 69 in the support ring 67 enable the water flowing through tubes 65 to exit therethrough. The tube sheet 56 is supported below the core 3 by a baffle 71 which has one opening thereof welded to the periphery of the tube sheet 56 and has the other opening welded to the inner wall of the hemispherical section 9a of the pressure vessel 2. The other function of the baffle 71 is to direct the incoming (first pass) water toward the openings in the tube sheet 56 and isolate it from the second pass flow. The two pass flow system is used to obtain the desired water temperature rise in the reactor with the maximum power output and still not exceed the maximum fuel element surface temperature. The two pass system also provides the advantage of utilizing the lower heat generating outer area (low neutron flux) for heating warmer water from the first pass and eliminating severe water throttling in the outer areas to obtain a uniform coolant outlet temperature from all elements.

The water inlet ports 9 are located in the hemispherical section 9a of the pressure vessel 2. Treated water flows into the vessel 2 through the ports 9 and upward, in its first pass, through the 406 fuel elements 12 in the center of the core 3 via the openings 55 in the tube sheet 56. At the top of the core 3, the first pass water divides; three-quarters flowing down through the 272 second pass fuel elements 12 located outside the boundary 30 (Fig. 3), one-eighth flowing through the tubes 65 in the reflector 4 and the annulus 7, and one-eighth flowing through the spaces between the side walls 38 of adjacent fuel elements 12. The heated water discharges thereafter through the outlet ports 10 at the lower end of the straight section 10b of the pressure vessel 2 and flows to heat exchangers and other associated equipment comprising a turbo generating system as shown in Fig. 19.

*Control system*

A particular control system for controlling neutronic flux was adopted for the purpose of minimizing distortions in the axial flux pattern and also for producing a flatter radial flux pattern. This system consists basically of an integrated liquid poison shim control and safety control.

Shim control is derived principally by adjusting the concentration of a neutron absorbing solution (commonly known as "poison") confined to 34 shim control devices 28. The poison is circulated through a closed system isolated from the main reactor coolant.

The poison solution selected is cadmium nitrate dissolved in demineralized water. Advantages of cadmium nitrate are as follows: (1) Cadmium has a very high absorption cross section for thermal neutrons; (2) cadmium releases most of the gamma radiation within a very short period of time after absorbing neutrons; (3) cadmium nitrate is a common compound readily available and inexpensive; (4) cadmium nitrate is highly soluble in water and therefore easily prepared; (5) cadmium nitrate is not corrosive and will not exert detrimental effects either on stainless steel or zirconium; and (6) the gamma rays released by the cadmium upon absorption of neutrons cause very little decomposition of the water. Although cadmium nitrate was selected as the poison for the reasons indicated above, boric acid, cadmium sulphate, boron nitrate, boron sulphate and lithium salts could be substituted.

Figure 2:
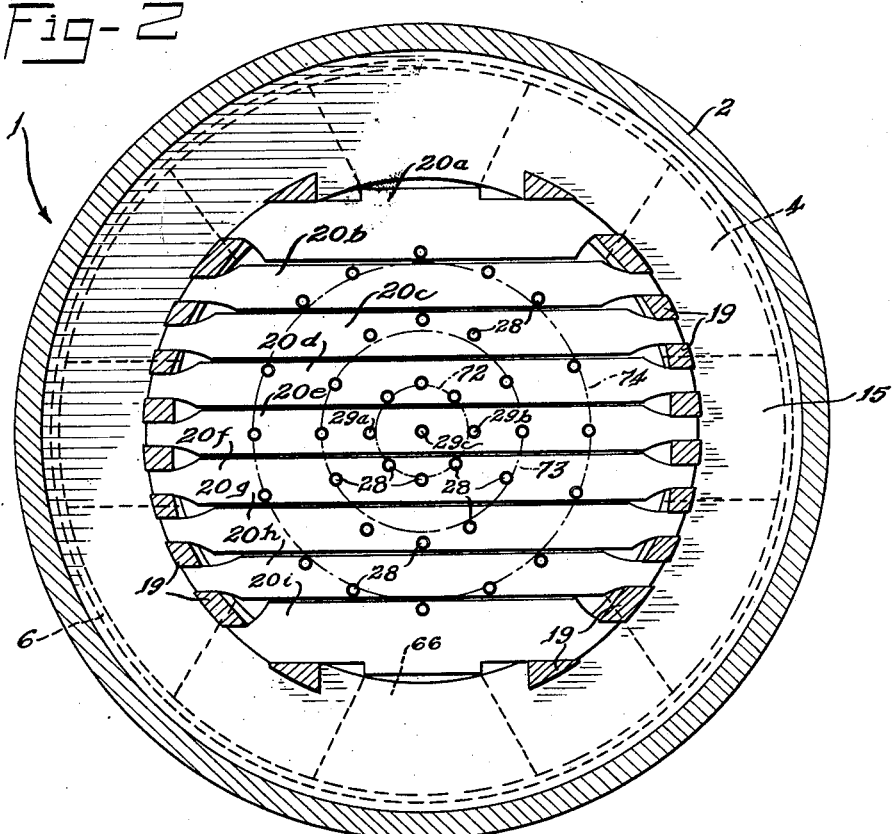
Fig. 2 is an enlarged plan view of an active portion of the reactor taken along line 2—2 of Fig. 1.

As shown in Fig. 3, each shim control device 28 occupies the same space as a fuel element 12. These devices are generally grouped in three coaxially disposed rings 72, 73 and 74, as indicated in Figs. 2 and 3. Each ring, as will be described hereinafter, is independent of the other rings and maintains its individual poison concentration at a preset value. In reference to Figs. 9–15, each control device 28 comprises a shim control portion 75a containing elements for controlling the reactor during normal operation and a safety portion 75b containing elements for shutting down rapidly the reactor in emergency situations. The control portion 75a comprises a hollow, approximately rectangular element 76 having located therein another hollow element 77 which is mounted coaxially within the member 76 by webs 78 which run essentially from one extremity of the control portion 75a to the other extremity thereof. The webs 78 together with elements 76 and 77 create two separate channels 79 and 80. The elements 76 and 77 are made of zirconium. The rectangular conformation of the control portion 75a tapers down somewhat towards one extremity thereof and terminates in two tubes 82 and 83 having openings 82a and 83a, respectively. The tubes 82 and 83 have a plurality of individual seal rings 84 and 85 mounted on the exterior of the tubes, said seal rings performing the function of maintaining a tight joint between the tubes 82 and 83 and the openings 55 in the tube sheet 56 so that there is no loss of poison in the system. The other extremity of the control portion 75a terminates in a collar 86 which has an internal threaded portion 87. A support 88 engaging the threaded portion 87 of the collar 86 supports the entire control portion 75a from the grid 31.

Fig. 11 shows a cross section of the control portion 75a taken along the line 11—11 of Fig. 12. The channel 79 communicates with the channel 80 across the webs 78 (Fig. 12). The channel 79 communicates with the opening 83a and channel 80 communicates with the opening 82a. It is readily seen that the structure of the control portion 75a varies internally and that the cross sectional areas of the channels 79 and 80 increase towards the center of said control portion from each extremity thereof. The cross sectional areas of the channels 79 and 80 are reduced gradually above and below the center section of the control portion 75a to approximately one-half the maximum at points which are located approximately one-fifth of the length from each end of said channels to thereby effect maximum neutron absorption in the central portion of said control portion. The neutron absorbing portion of the control member 75a is approximately 11′ long and extends about 6″ beyond each end of the 10″ length of the fuel elements 12 as shown in Fig. 5. The combined area of the channels 79 and 80 at the cross section level 14—14 of Fig. 10 is 3.87 square inches; and the combined area of said channels at the cross section level 13—13 of Fig. 10 is 1.93 square inches. The webs 78 function to separate the annular space between the elements 76 and 77 essentially throughout the entire length of the control portion 75a except at the end thereof where it is attached to the collar 86. As seen in Fig. 10, the webs 78 extend upward until they terminate at the points 89 wherein the poison flowing in one of the channels will flow over the points 89 into the other channel on its way out of the control portion 75a. The inner element 77 has an internal opening 90 which extends from a bottom 91 and communicates with a bore 92 found in the collar 86 and the support 88. The opening 90 communicates with the exterior of the control portion 75a by means of an opening 94 which extends outward from the bottom 91.

The remaining portion of the device 28, namely the safety portion 75b, comprises a housing 95 having contained therein a safety element 96 made of neutron absorbing material having a neutron capture cross section of over 200 barns such as cadmium or boron. The lower extremity (as shown in Fig. 9) of the housing 95 is flared to facilitate proper alignment with a shock absorber assembly 97 comprising a spring 97a in a housing 97b. The absorber assembly 97 is mounted on the fuel support beam 17 and functions to cushion the fall of the safety element 96 released during a scram. The housing 95 is adapted to contain the supporting structure as well as the actuating structure of the safety element 96. The safety element 96 is a hollow tube terminating in a soft iron armature 98 held magnetically by an electromagnet 99 secured to a piston 100 which fits snugly within the lower portion of the housing 95. The piston 100 is made of electroconductive material such as copper in order to form an electrical contact with the metal housing 95. The electromagnet 99 is energized through a flexible lead 101 which is connected between an insulated terminal 102 mounted at the closed extremity of the housing 95 and an insulated terminal 103 which extends through the piston 100 and is connected to one end winding 104 of the electromagnet 99. The other end of the winding 104 is connected to the armature 98 which forms a part of ground return circuit. Since the insulation on the flexible lead 101 has to withstand high temperatures and radiation damage, ceramic beads (not shown) are used for this purpose. The movement of the piston 100 within the interior of the housing 95 is limited by an upper piston stop 105 and a lower piston stop 106. The upper portion of the housing 95 passes through the head closure 22 and has an opening connected to a tube 108 which may be connected to a source of vacuum. The housing 95 is welded to the head closure 22 and is designed to withstand a pressure of 800 p.s.i.a.

During the operation of the reactor 1, the safety element 96 is maintained withdrawn out of the reactor at which time the piston 100 is adjacent to the stop 105. The safety element 96 is maintained in that position by means of reduced pressure existing in the upper portion of the housing 95. If a malfunction should occur within the reactor proper, and an abnormal amount of neutron flux would be generated, the electromagnet 99 would be deenergized whenever the abnormal amount of flux would exceed a predetermined safety limit, to thereby cause the release of the safety element 96 and its subsequent drop into the opening 90. A total of 34 safety rods 96 are in readiness to drop into the reactor core 3 on a scram signal. The circuit arrangement for the release of the safety elements 96 is well known in the art and does not form a part of the invention. To subsequently withdraw the released safety element 96 out of the opening 90, the pressure within the upper portion of the housing 95 is increased by suitable means to cause the piston 100 to descend toward the stop 106 and to come in contact with the armature 98. Subsequent energization of the electromagnet 99 followed by evacuation of the upper portion of the housing 95 will raise the safety element 96 to its uppermost position. A fair amount of tolerance is present between the safety element 96 and the inner element 77 so that during the plunge of said safety element into the opening 90 of the inner element 77, some of the water contained in the opening 90 would be forced out near the top thereof at the point of entry of the safety element 96 and the remainder of the water would be forced out through the opening 94 located at the lower end of the control portion 75a.

The reactivity in the reactor 1 is controlled by regulating the flow of poison in the three rings 72, 73 and 74 of the shim control devices 28. A control system, described hereinafter, introduces the poison into each concentric ring of shim control devices 28 by means of shim control pipes 109 which are connected to three pairs of headers 110. One header of each pair directs the poison into the shim control devices 28 forming the ring and the other header collects the poison from the devices prior to its discharge out of the reactor. The flow of the poison through one pair of headers is indicated by arrows in Fig. 1.

Fig. 16, shows the piping in a flow diagram for a control system utilizing shim control devices 28 described herein. The components shown in the diagram are conventional and will not be described in detail. The changes in the poison concentration are obtained by adding either water or highly concentrated cadmium nitrate solution.

A preset restricted flow valve 120 controls the amount of water dilution. This water is obtained from the reactor coolant system because it is a plentiful source of demineralized water at the desired temperature. Another factor is the ease in maintaining the desired differential pressure between reactor coolant and liquid poison solution. A purge valve 121 by-passes the restricted flow valve 120 and is utilized to flush the poison out of the system whenever desired. Excess solution is passed to an overflow tank 122 having a capacity of 600 gallons.

Separate pipes to each of the three concentric rings of control devices 28 allow the individual adjustment of poison concentrations. This offers a wide flexibility of control. A pump 123 for each ring 72, 73 and 74 circulates the solution at approximately 5 ft./sec. through the control devices 28. A complete cycle is made in approximately 10 seconds. The effective poison concentration is determined by a detector 124 in each loop. The heat developed in the poison solution is removed externally by a small heat exchanger 125 which is common to all the rings. The internal piping in the heat exchanger 125 separates the flow of each ring. The cooling in the heat exchanger 125 is obtained by circulating water from a source of water supply 126.

The excess poison solution in the overflow tank 122 is cooled as it is passed through a small heat exchanger 127 into an evaporator 128 to prevent the solution from flashing into steam as it passes from the pressurized overflow tank to the evaporator which is maintained at a substantially lower pressure of around one atmosphere. A heater 129 supplies controlled heat to drive off the water content of the poison solution. The concentrated solution in the evaporator 128 is then returned by a pump 130 to a poison control mixing tank 131 for reuse. The capacity of the mixing tank 131 is 400 gallons. Drainage means are provided for disposing liquid waste from the evaporator 128. The poison in the tank 131 is mixed by a mixer 131a and is then fed into a poison control storage tank 132 by a pump 133.

Helium gas pressure within the poison control storage tank 132 (400 gal. capacity) is maintained at a pressure of 800 p.s.i. which is equal to the reactor coolant pressure. The pressure of the poison solution passing through the control devices 28 is maintained approximately 50 p.s.i. below the reactor coolant pressure by regulating the pressure of helium in the overflow tank 122 with regulator 134. Therefore, reactor coolant water will tend to leak into the poison control solution rather than the reverse thereby preventing the contamination of the primary coolant. The concentration of the poison in each ring is controlled by valves 135.

The liquid shim control is inherently slow, therefore, three regulating rods, generally designated 29, made of material having a neutron capture cross section over 200 barns such as cadmium-silver steel are used for the fine adjustment of the reactor control. Usually, a single regulating rod 29c, located at the center of the reactor core 3 (Fig. 3), will be adjusted to maintain criticality. The other two regulating rods 29a and 29b are located in line approximately nine inches away from the center rod 29. These outer rods 29a and 29b are normally in the out position, ready to be inserted in case of any rapid increase in "k." The two outer regulating rods 29a and 29b are designed to supplement the center rod 29c. In case the center rod 29c should become jammed, the reactor may still be operated safely by either or both of the remaining rods 29a and 29b. A zirconium guide 137 (Fig. 1) has an internal bore to accommodate the entry of the regulating rod 29, said guide occupying the same space as one of the fuel elements 12 (Fig. 3). The rod 29 operates in a housing 138 in a manner which is well known in the nuclear art, such as by a rack and pinion drive (not shown). The housing 138 is welded to the head closure 22 and is designed to withstand high pressure.

Figure 17:
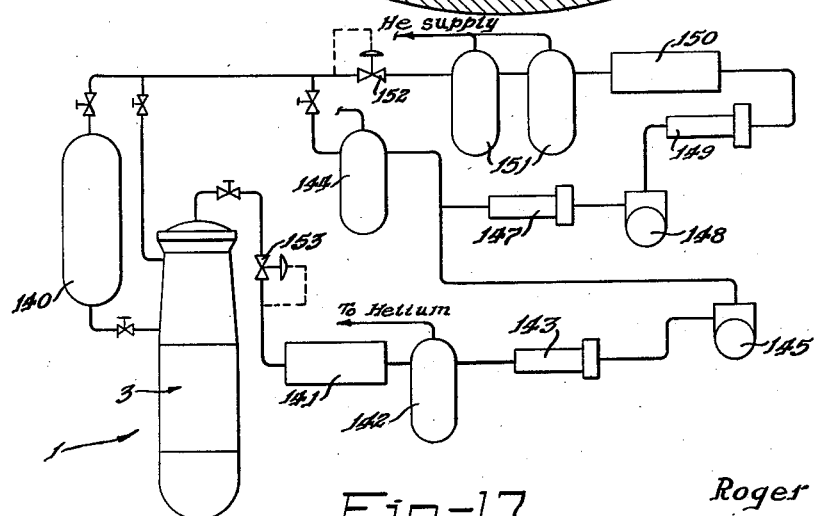
Fig. 17 is a schematic diagram of a gas system providing an inert gas blanket in the primary coolant system and adapted to absorb pressure surges.

A helium system, as shown in Fig. 17, is incorporated in this reactor to perform two functions. The major function is to provide an inert gas volume in the primary coolant system to act as a cushion for system pressure surges. These pressure surges can be caused by sudden changes in reactor operating power. A stainless steel clad tank 140 connected by pipes to the reactor vessel 2 provides 2000 cu. ft. of expansion volume and 500 cu. ft. of water volume. The water level in the tank 140 is the same as in the reactor vessel 2 and is allowed to vary from ten feet above the top of the reactor core 3 to the top of the reactor vessel 2.

The secondary function of the helium system is to provide an inert gas for sweeping away the dissociation products produced by irradiation. A small amount of helium is circulated through the space above the water level in the reactor vessel 2. The mixture of helium and dissociation products is expanded and passed through a recombiner 141 into a low pressure helium storage tank 142 from which the helium is withdrawn and cooled in a cooler 143 and then pumped into a high pressure storage tank 144 by means of a compressor 145. A part of the gas removed from the storage tank 142 is additionally cooled by a cooler 147, compressed by a compressor 148, cooled further by a cooler 149, purified by a purifier 150, and then stored in storage tanks 151. Helium gas was selected for pressurizing the system since other gases, such as nitrogen or carbon dioxide, form acids in the presence of high energy radiation and lower the pH of the circulating water.

The storage portion of the helium system consists of tanks containing a total volume of 2500 cu. ft. The tanks 151 contain 1000 cu. ft. of gas and operate between 800 p.s.i.a. and 1000 p.s.i.a. to serve as a reserve supply for maintaining reactor operating pressure. The tank 144 contains 1000 cu. ft. of gas and operates at 120 p.s.i.a. to serve as a dump reservoir in case the reactor exceeds the relief pressure. The tank 142 has a volume of 500 cu. ft. of gas and operates at slightly above atmospheric pressure, to which tank the circulating helium is returned and make-up helium is supplied. The reactor pressure is automatically or manually controlled with a regulating valve 152 which supplies helium from the high pressure tanks 151. The amount of circulating helium is manually controlled to the desired quantity, depending upon the amount of system pressure fluctuation, by adjusting a valve 153.

The compressor 148 operates between 120 p.s.i.a. and 1000 p.s.i.a. and the compressor 145 operates between 15 p.s.i.a. and 120 p.s.i.a. to maintain the desired pressures. The function of these compressors is to return the circulating helium from the recombiner 141 to high pressure storage tanks 151.

TURBOGENERATOR POWER SYSTEM

The turbogenerator system shown in Fig. 19 comprises two phases: The steam phase shown in solid lines and the electrical phase shown in broken lines. The steam output of the reactor 1 is fed through the outlet ports 10 (Fig. 1) into a pipe 160 of Fig. 19 to a steam generator 161 where, as a result of heat exchange, other steam is generated and is directed along the pipe 162 to a turbine 163 driving an electric generator 164. The spent steam in the turbine 163 is condensed, as will be described hereinafter, and is withdrawn through a pipe 165 by boiler feed pumps 166 and 167 and directed again through a pipe 168 into the steam generator 161. The spent steam, on the other hand, in the steam generator 161 is withdrawn through a pipe 169 by coolant pumps 170 and 171 and returned by a pipe 169a to the reactor 1 by way of inlet ports 9. The spent steam in the turbine 163 is converted by heat exchange relationship into a condensate by means of a coolant flowing in a pipe 172. This coolant is pumped from a source 173 by means of circulating pumps 174 and 175. A portion of the electrical output of the generator 164 is taken off by means of a line 177 and is used to drive a series of electric motors 166a, 171a and 174a, said motors being used to drive their individually associated pumps 166, 171 and 174 for pumping steam and condensate in the system. A portion of steam output from the steam generator 161 is by-passed by a line 176 to supply power to a series of steam engines 167a, 170a and 175a which drive their individually associated pumps 167, 170 and 175. As is readily seen, the pumps 166 and 167, 170 and 171, and 174 and 175, are driven by engines powered by different media, steam and electric. The power output of the system as well as other operating characteristics are disclosed in Table IV, as shown hereinafter.

A water-cooled, water-moderated reactor which has been described utilizing the shim control devices 28 has the following specifications:

TABLE 1
Core constants

| | |
|---|---|
| Geometry: Right cylinder | Approx. 8' dia. by 10' high. |
| Total weight of uranium fuel, tons per charge | 87.12. |
| Total weight of zirconium, tons | 18.0. |
| Weight of fissionable material, kg | 949.3. |
| Average cycle time (600 mwd./ton), days | 52.0. |
| Fuel element 12: | |
| Dimensions | 2.99" x 3.24" x 10'. |
| Number of fuel plates 34 per element | 9. |
| Weight per element, lbs. | 310.12. |
| Uranium, lbs | 257.00. |
| Zirconium cladding, lbs | 17.24. |
| Zirconium side plates, lbs | 33.84. |
| Zirconium transition pieces 13 and 14, lbs | 2.04. |
| Total zirconium, lbs | 53.12. |
| Total fuel elements 12 | 678. |
| Cladding material | 10 mil Zr (95%)—Sn (5%). |
| Cladding temperature, max., °F | 480. |
| Number of fuel assemblies 20 | 9. |
| Water/uranium, volume ratio | 1.5. |
| Zirconium/uranium, volume ratio | 0.144. |

TABLE II
Power data
[1" Hg turbine back pressure]

| | |
|---|---|
| Heat released in reactor, mw | 1243 |
| Generator output, kw | 286,559 |
| Auxiliary power, kw | 13,640 |
| Net output, kw | 272,919 |
| Heat flux, maximum B.t.u./hr. ft.$^2$ | 400,000 |
| Heat flux, average B.t.u./hr. ft.$^2$ | 164,800 |
| Heat flux, maximum/average | 2.43 |
| Reactor heat transfer coefficient, $h$, B.t.u./hr. ft.$^2$, °F | 7,643 |
| Specific power, kw./kg. fissionable material | 2,215 |
| Specific power, mw./ton fuel | 14.3 |
| Neutron thermal flux, maximum, nv | 5.3 x 10$^{13}$ |
| Neutron thermal flux, average, nv | 2.2 x 10$^{13}$ |

TABLE III

Reactor data

[1" Hg turbine back pressure]

| | |
|---|---|
| Average reactor inlet temperature, °F | 369.4 |
| Average reactor outlet temperature, °F | 440.7 |
| Reactor pressure, p.s.i.a | 800 |
| Total coolant flow rate, $10^6$ lbs./hr | 54.7 |
| Maximum coolant velocity, ft./sec | 25 |
| Reactor heat transfer area, ft.$^2$ | 25,430 |
| System pressure drop, p.s.i | 150 |
| Pumping power required, kw | 20,138 |

TABLE IV

Steam generator and turbogenerator data

[1" Hg turbine back pressure]

| | |
|---|---|
| Steam pressure, p.s.i.a | 180 |
| Steam temperature, saturation, °F | 373.1 |
| Feed water temperature (condensate temp.), °F | 79.1 |
| Total steam flow, $10^6$ lbs./hr | 3.6 |
| Steam generator steam flow, lbs./hr | 152,200 |
| Turbogenerator steam flow, lbs./hr | 913,163 |
| Boiler feed pump flow, lbs./hr | 456,000 |
| Condenser cooling water flow, g.p.m | 736,000 |

TABLE V

Heat production and removal

[1" Hg turbine back pressure]

| | |
|---|---|
| Reactor heat generation, mw | 1,243 |
| Heat transfer area, ft.$^2$ | 25,430 |
| Maximum heat flux, B.t.u./hr. ft.$^2$ | 400,000 |
| Average heat flux, B.t.u./hr. ft.$^2$ | 164,800 |
| Maximum to average heat flux | 2.43 |
| Center to average radial heat flux | 1.66 |
| Coolant inlet temperature, °F | 369.4 |
| Coolant outlet temperature, °F | 440.7 |
| Average temperature rise of coolant, °F | 71.3 |
| Coolant flow, $10^6$ lbs./hr | 54.75 |
| Average coefficient of heat transfer, B.t.u./hr. ft.$^2$, °F | 7,643 |

| | First Pass | Second Pass |
|---|---|---|
| Average velocity, ft./sec | 25.0 | 24.9 |
| Maximum to average radial heat flux | 1.33 | 1.36 |
| Center to average radial heat flux | 1.33 | 2.65 |
| Average coolant temperature, rise, °F | 47.5 | 23.8 |
| Maximum zirconium temperature, °F | 463 | 479 |
| Allowable hot channel factor (at 500° F. max.) Zr | 1.80 | 1.81 |

In the reactor described above, the principal temperature coefficient of reactivity is due to water density changes. An excess reactivity of 4 percent is built into this reactor to take care of the reactivity changes due to temperature changes. As described hereinabove, the core 3 comprises a plurality of units, namely 34 shim control devices 28, three regulating elements 29 and 678 fuel assemblies 20, each of the aforesaid units occupying an equal unit volume in said core. The various magnitudes of $\delta k$ of the reactor are set out below:

| | |
|---|---|
| $k_\infty$ | 1.10 |
| $\delta k$ leakage | 0.015 |
| $k$ eff., cold clean | 1.085 |
| $\delta k$ temp. | 0.04 |
| $\delta k$ xenon | 0.03 at equillibrium |
| $\delta k$ samarium, max. | 0.008 |
| Therefore, $\delta k$ operating reserve | 0.007 |

$\delta k$ operating reserve varies from 0 to 0.02 depending on the operating time. The initial conversion ratio of 1.0 results in an increase in effective $k$ for a short period of power operation before the fission poisons and burnup effect reduces the $k$(effective) to 1.0. The maximum $\delta k$'s of the shim control devices 28 and the regulating elements 29a, 29b and 29c are as follows:

| | Each Unit Vol. | No. of Unit Vols. | Total $\delta k$ |
|---|---|---|---|
| Center regulating element 29c | 0.0030 | ×1 | 0.003 |
| Inner ring 72 comprising shim control devices 28 and the regulating elements 29a and 29b. | 0.0035 ea | ×8 | 0.028 |
| Middle ring 73 of devices 28 | 0.0028 ea | ×12 | 0.034 |
| Outer ring 74 of devices 28 | 0.0016 ea | ×16 | 0.025 |
| | | | 0.090 |

As described hereinbefore, the shim control is derived principally by adjusting the poison concentration of the liquid solution confined to the thirty-four shim control devices 28 arranged in 3 concentric rings 72, 73 and 74, each ring having an individual adjustment for maintaining a particular poison concentration. As a result of utilizing control devices 28 which have a maximum neutron absorption in the mid-section thereof, and their subsequent arrangement into concentric rings, an optimum flux (heat) distribution is obtained both in the axial and the radial directions.

The minimum concentration of poison is an economic balance between the cost of diluting a poison in the system to the cost of the loss of reactivity. Minimum concentrations may be in the order of 0.0005 gm. of cadmium nitrate —$Cd(NO_3)_2$— per cubic centimeter of $H_2O$ resulting in a loss of reactivity less than 0.001. The maximum concentration, on the other hand, is that value which additional concentration and poison gives only a very slight increase in $\delta k$ effectiveness. A maximum of 0.5 gm. of $Cd(NO_3)_2$ per cubic centimeter of $H_2O$ is adequate to provide sufficient poisoning effect.

When the above-described reactor is operated at full power, the concentrations of the poisons are as follows:

| | Poison Concentration, gm. $Cd(NO_3)_2$/cc. | Each Unit Volume $\delta k$ | No. of Unit Volumes | Total $\delta k$ |
|---|---|---|---|---|
| Inner ring | 0.015 | 0.0007 | 8 | 0.0056 |
| Middle ring | 0.008 | 0.0003 | 12 | 0.0036 |
| Outer ring | 0.005 | 0.005 | 16 | 0.005 |
| | | | | 0.01 |

Since all of the pertinetn data on the structure of the reactor and operational data on the helium gas and the poison systems have been presented already, a summary of operation of the described water-cooled, water moderated reactor is given. Before the reactor 1 is brought up to full power from a cold-clean condition, the controls in the helium gas system shown in Fig. 17 are adjusted to obtain the proper pressures enumerated before. As is usual in initial reactor startup, all the regulating elements 29a, 29b and 29c are completely contained in the core 3 of the reactor 1 thereby exerting maximum effect on neutron absorption. The concentration of the poison, in the system, as shown in Fig. 16, is individually adjusted for all rings 72, 73 and 74 at a maximum value. This adjustment is accomplished by turning the valves 135 until the desired concentrations are indicated on the detectors 124. Then the safety elements 96 in all of the shim control devices 28 are raised out of the core 3 of the reactor 1 while observing reactivity changes on instruments well known in the nuclear art. Additionally, the regulating elements 29a and 29b are removed from the core 3 leaving only the regulating element 29c within the confines of the core 3. Finally, the regulating element 29c is removed from the core 3 while watching the instruments indicating reactivity and the reactor period. After the reactor 1 reaches criticality, an nicrease in power is obtained by inserting the regulating element about halfway in and then adjusting the valves 135 until the desired power output is obtained. Since the action of the poison system is inherently slow, the regulating element 29c is used during power operation for maintaining the output at a constant value. If, after a certain period of operation, due to fuel burnup and fission poisons, the control range of the regulator 29c is incapable of exerting proper control, the valves 135 are adjusted to decrease the concentration of the poison in the system thereby again reverting control of the reactivity to the regulating rod 29c.

If additional information is desired on the methods of reactor control reference may be made to "Science and Engineering of Nuclear Power," Addison-Wesley Press, 1947, chapter 8, and to Fermi and Szilard, U.S. Patent 2,708,656, columns 51–56. Suitable instruments and components for a reactor control system are listed in "Nucleonics," vol. 11, No. 6, 1953, pages 35–40. Automatic control of power reactors is described in "Nucleonics," vol. 6, No. 2, 1950, pages 58–65. The method of starting up a reactor is described in "Nucleonics," vol. 6, No. 2, 1950, page 59, and also in "Nuclear Engineering," part 1, Chemical Engineering Progress Symposium Series, vol. 50, No. 11, 1954, pages 221–223.

The shim control device 28 has been described hereinbefore in reference to a particular reactor, namely a water-moderated, water-cooled type. It is to be understood that the control device 28 can be used in conjunction with other types of reactors, such as are described in U.S. Patent 2,708,656, issued to Fermi and Szilard on May 17, 1955. For example, the control device 28 described hereinbefore can be used with a slight modification in the liquid-cooled, graphite-moderated reactor described in said patent and illustrated in Figs. 37 and 38 thereof.

If reference is made to Fig. 18, a control device 28c is shown contained in a portion of a liquid-cooled neutronic reactor 350 having a graphite reflector 351 enclosed by a fluid tight steel casing 352 which is supported by I-beams 354 resting on a foundation 353. A layer of water 356 covers the top of the casing 352. A series of coolant pipes 359 extend through the reactor 350 and serve the dual purpose of cooling the reactor and holding a charge of slugs made of fissionable fuel.

The control device 28c comprises a control member 75ac and a safety member 75bc. The control member 75ac has an element 76c having one extremity thereof terminating in a pair of tubes 82c and 83c connected to pipes 400 and 401, respectively. The other extremity of the element 76c terminates in a collar 86c which has a support flange 88c resting on the casing 352 and which flange supports most of the mass of the control member 75ac. A tight closure exists between the collar 86c, the flange 88c and the casing 352 to prevent the leakage of water 356 into the reflector 351. The safety member 75bc has a bell shaped opening engaging loosely with a shock absorber assembly 97c mounted on the flange 88c. The safety member 75bc is suported from its upper extremity by a plate 22c which is mounted on the top of the reactor 350. A tube 108c, at the upper extremity of the safety member 75ac, presents an access to the interior of said safety member for applying a fluid medium thereinto under pressure. A safety element 96c (shown by hidden lines) is contained within the device 28c. The internal structure of the control device 28c is identical to the internal structure of the device 28 shown in Figs. 9–15 with the exception that the device 28c, in its lower extremity, has no opening corresponding to the opening 94 in the device 28, as shown in Fig. 11. Sufficient clearances exist between the safety element 96c and the inner wall of the element 76c as well as between the shock absorber assembly 97c and the flared opening of the safety member 75bc to permit egress to the water contained within the control member 75ac whenever the safety element 96c is dropped thereinto.

Although only one device 28c is shown in the portion of the reactor 350, it is understood that a plurality of such devices may be connected together, such as rings, in the manner previously described, to a poison control system shown in Fig. 16. For example, a group of control devices 28c may be substituted for the ring 74 and have their individual pipes 400 and 401 connected to the points "A" and "B" of the poison control system and used for controlling the reactivity in the reactor in the manner previously described. As described so far, very little modification of the first embodiment of the control device 28 was necessary to adapt its use in the Fermi-Szilard reactor.

The reactivity within the reactor 350 is controlled by the control device 28c. The reference numbers (above 350) which have been used to identify the various components of the portion of the reactor 350 shown in Fig. 18 are identical to the reference numbers used to identify the various components of reactor structure disclosed in Figs. 37 and 38 of the Fermi-Szilard patent. Inasmuch as the present control device 28c functions not only as a shim regulating control but also has safety control features of the safety member 75bc, the control device 28c can be substituted in lieu of the shim rod 370a and the safety rod 370b shown in Fig. 37 of said Fermi et al. patent. It is understood, of course, that the amount of neutron absorbing material contained in said replaced shim rod 370a and the safety rod 370b of the Fermi et al. patent is equal to the amount of both the neutron absorbing material dissolved in the poison solution and to the neutron absorbing material in the safety rod member 96c in the device 28c.

The modified control device described hereinbefore in conjunction with the liquid-moderated liquid-cooled reactor can be adapted also for use in another type of a reactor described in the Fermi et al. patent. For example, the control device 28c may be utilized in the reactor shown in Fig. 7 of the Fermi et al. patent to replace the safety rod 41 and the shim rod 30 shown thereon. Since the safety rod 41 and the shim rod 30 in the above patent are adapted to be moved horizontally, it is within the skill of the art to position the present control device 28c, which previously has been shown to operate in the vertical plane, so that it can be utilized horizontally in the reactor shown in said patent. In this case, as in the previous instance, it is understood that neutron absorbing capability of the device 28c including the safety member 96c is equivalent to the neutron absorbing capability of the replaced shim rod 30 and safety rods 41 in the patented reactor.

While there has been described what is at present considered to be the preferred embodiment of the invention, it will be understood that various modifications may be made therein and it is intended in the appended claims to cover all such modifications as found within the true spirit and scope of the invention.

What is claimed is:

1. In a neutronic reactor comprising an active portion containing thermal-neutron fissionable fuel and a plurality of devices extending through the active portion and arranged in a plurality of circular concentric arrays around the central axis of the active portion for absorbing neutrons released therein, the improvement wherein each of said devices comprises two hollow elements coaxially disposed and froming a space therebetween, a pair of oppositely situated webs disposed between said elements and extending from one extremity thereof to within a short distance of the other extremity to thereby form two separate channels having communication therebetween at said other extremity, means for circulating a concentration of neutron absorbing fluid in the channels of each array of the devices for affecting gradually the reactivity, and a neutron absorbing element slidably positionable in the inner element for affecting abruptly the reactivity to thereby shut down the reactor.

2. In the reactor claimed in claim 1, wherein the cross sectional areas of the channels increase from both of the extremities toward the center of the device, the volume of the neutron absorbing fluid being greater in the middle portion of the device to thereby effect greater neutron absorption in the middle portion of the reactor.

3. A device for affecting neutron flux in the core of a neutronic reactor comprising two coaxial hollow members defining a volume therebetween, the cross sectional area of said volume increasing from each extremity of the device toward the center thereof, a pair of webs separating said volume into two longitudinal channels which communicate with each other at one extremity of the device, means for circulating a neutron absorbing fluid through the channels whereby said device is effective to achieve a greater absorption of neutrons at its center than at its extremities, and a neutron absorbing element slidably positionable in the inner member to effect total neutron absorption in the vicinity thereof.

4. An apparatus for controlling neutron flux distribution in the active portion of a nuclear reactor comprising groups of devices extending throughout the active portion of the reactor and arranged in concentric rings about the central axis of the reactor, each of said devices having a pair of channels extending longitudinally therethrough and joining each other at one extremity of the device, one of said channels having an inlet and the other having an outlet, the transverse cross section areas of the channels increasing from both of the extremities of the device toward the center thereof, the inlets of each group of devices being commonly connected together and the outlets of each group being commonly connected together at one extremity of the devices, means for circulating a neutron absorbing fluid of a particular concentration through each group of devices, and a neutron absorbing element slidably positionable adjacent the channels, whereby axial flux flattening is achieved by the presence of greater volume of the fluid in the central portion of the channels, radial flux flattening is achieved by a different concentration of the fluid in each ring, and shut-down of the reactor is obtained by insertion of the neutron absorbing element into the reactor.

5. In the apparatus claimed in claim 4, the device in each group comprising a pair of hollow varying shaped members coaxially disposed to form a varying volume therebetween, said volume increasing from both extremities of the device toward the center thereof, a pair of webs extending from one extremity of the members and ending short of the other extremity to thereby separate the volume into two channels, said channels having an inlet and an outlet at one extremity, said inlet and outlet communicating with each other at the other extremity of the device, means for commonly connecting at one end of the device the channels of each group and circulating a neutron absorbing fluid of particular concentrations therethrough, each of said devices being effective to absorb more neutrons in its central portion than at its extremities, a neutron absorbing safety member being disposed at the unconnected extremity of each device, and means for inserting rapidly said member into the interior of the inner member to substantially absorb all neutrons incident upon said device.

6. A neutronic reactor comprising an active portion containing thermal-neutron fissionable fuel, a plurality of elongated devices arranged in groups in a predetermined manner and extending through said active portion, each of said devices possessing a longitudinal channel therein, each channel having a variable cross section along its length, said variable cross section increasing in area from each extremity of the device towards its center, means for maintaining a flow of neutron absorbing fluid through each of said groups of devices, means for varying individually the concentration of the fluid in each group whereby the amount of neutrons absorbed by any portion of each device is proportional to the volume and concentration of the fluid contained in said portion, and a neutron absorbing element slidably positionable in the channel for absorbing all neutrons incident upon the device.

7. In the reactor as claimed in claim 6, each device comprising a pair of longitudinal channels for conducting the fluid, each pair of channels forming an inlet and outlet at one end of the device and communicating with each other at the other end thereof, the cross sectional area of the channels increasing from its ends towards the center to effect maximum neutron absorption in the central portion thereof to thereby achieve axial flattening of the flux, said concentration varying means adapted to vary individually the concentration of the neutron absorbing fluid in each of the groups to thereby effect a particular radial flux distribution, each of said pairs of longitudinal channels being disposed with respect to each other to form a hollow therebetween, said neutron absorbing element effective in response to actuation to occupy the hollow between said channels and absorb all the neutrons incident upon the device to thereby shut down the reactor.

8. In the reactor as claimed in claim 6, each device comprising two longitudinal channels for conducting the fluid, said channels being approximately ten feet long, the cross sectional area of the channels being reduced gradually above and below the center section to approximately one-half the maximum at points one-fifth of the length from each end of the channels to effect maximum neutron absorption in the central portion to thereby achieve axial flattening of the flux, said concentration varying means being adapted to vary the concentration of the neutron absorbing fluid in each of the groups to thereby effect a particular radial distribution of flux, the longitudinal channels of said element being disposed with respect to each other to form an opening therebetween, said opening being adapted to receive the neutron absorbing element upon actuation thereof in response to a demand for shutting down the reactor.

9. A device extending into the active portion of a neutronic reactor for controlling reactivity therein, comprising two hollow elements coaxially disposed and forming a channel therebetween, the cross sectional area of said channel increasing from each extremity of the device toward the center thereof, an element of neutron absorbing material slidably positionable within the inner hollow element, and means for introducing a fluid neutronic reactor poison into the channel for absorbing neutrons in the active portion of the reactor.

10. The device as claimed in claim 9, said last means comprising a container filled with neutronic reactor poison, a source of diluent, a regulator connected to the source and the container for mixing and controlling the concentration of the neutronic reactor poison in said diluent, a pump for forcing the mixture into the channel, a heat exchanger connected to the channel for cooling said mixture, and an evaporator for concentrating a portion of the mixture and forcing it into the container.

11. A device extending into the active portion of a neutronic reactor for controlling reactivity therein, comprising a hollow element coaxially located within an outer hollow element to form a space therebetween, the shape of the inner element tapering from each extremity thereof toward the center of the element to define a varying cross sectional space between said elements, a pair of walls dividing the space between the elements into channels and supporting the elements in fixed relationship to each other, said channels having openings for admission of fluid thereinto and a safety element of neutron absorbing material slidably positionable within the hollow of the inner element for effecting complete absorption of neutrons incident upon the device.

12. A neutronic reactor comprising, in combination, a pressure vessel supporting therein a core having a charge of uranium including fissionable material, a graphite reflector surrounding the core, a group of 678 fuel assemblies distributed in the core, each fuel assembly comprising nine zirconium-clad fuel elements supported parallel to each other in a spaced-apart relationship by a zirconium structure, means for directing water through the fuel assemblies to dissipate fission heat, the volume ratio of water/uranium being 1.5 and the volume ratio of zirconium/uranium being 0.144, a group of three regulating elements constructed of cadmium-silver steel and positionable within the core, a series of 34 shim control devices positioned in three coaxial groups among the fuel assemblies, each of said devices being constructed of two zirconium hollow elements coaxially arranged to form a varying channel therebetween, the cross sectional area of the channel increasing from each end towards the center of the device, means for circulating a solution of cadmium nitrate through the channels of the devices in each group, means associated with each circulating means for adjusting the concentration of cadmium nitrate between 0.0005 gram per cubic centimeter to 0.5 gram per cubic centimeter of water in each group of devices, and a safety element constructed of cadmium steel and adapted to be translated in the hollow of each inner element of each device, whereby a gradual and predetermined axial and radial flux distribution is achieved by circulating a different concentration of solution in each group of devices having varying cross sectional areas and a rapid safety control is obtained by inserting the safety elements into the shim control devices to stop totally the operation of the reactor.

13. A neutronic reactor comprising, in combination, a pressure vessel supporting therein a core having a charge of uranium fuel, including fissionable material, a graphite reflector surrounding the core, a group of 678 fuel assemblies distributed in the core, each assembly comprising nine zirconium clad fuel elements supported parallel to each other in a spaced-apart relationship by a zirconium structure, means for directing water through the fuel assemblies to dissipate fission heat, the volume ratio of water/uranium being 1.5 and the volume ratio of zirconium/uranium being 0.144, a group of three regulating elements constructed of material having a neutron capture cross section of over 200 barns and positionable within the core, a series of 34 shim control devices positioned in three coaxial groups among the fuel assemblies, each of said devices being constructed of two zirconium tubular elements coaxially arranged to form a varying channel therebetween, the cross sectional area of the channel increasing from each end toward the center of the device, means for circulating a neutron absorbing solution through the channels of the devices in each group, means associated with each circulating means for adjusting the concentration of the neutron absorbing solution to effect a 0.00016–0.0030 $\delta k$ in each group of the devices, and a safety element constructed of material having a neutron capture cross section over 200 barns and adapted to be translated in the hollow of each inner element, whereby a gradual and predetermined axial and radial flux pattern in the core is obtained by circulating a particular concentration of the neutron absorbing solution in each group of devices, and a rapid safety control is obtained by inserting the safety elements into the shim control devices to stop the operation of the reactor.

References Cited in the file of this patent

UNITED STATES PATENTS 2,735,811     Weinberg et al.     Feb. 21, 1956

UNITED STATES PATENT OFFICE

CERTIFICATE OF CORRECTION

Patent No. 2,917,444 December 15, 1959

Roger S. Dreffin

It is hereby certified that error appears in the above numbered patent requiring correction and that the said Letters Patent should read as corrected below.

In the grant, lines 1 to 3, for "Roger S. Dreffin, of Glen Ellyn, Illinois, read -- Roger S. Dreffin, of Glen Ellyn, Illinois, assignor to United States of America as represented by the United States Atomic Energy Commission, --; line 12, for "Roger S. Dreffin, his heirs or assigns" read -- United States of America, as represented by the United States Atomic Energy Commission --; in the heading to the printed specification, line 3, for "Roger S. Dreffin, Glen Ellyn, Ill." read -- Roger S. Dreffin, Glen Ellyn, Ill., assignor to United States of America, as represented by the United States Atomic Energy Commission --.

Signed and sealed this 31st day of May 1960.

(SEAL)
Attest:

KARL H. AXLINE

Attesting Officer

ROBERT C. WATSON
Commissioner of Patents